United States Patent
Ergezinger et al.

(10) Patent No.: US 7,898,989 B2
(45) Date of Patent: Mar. 1, 2011

(54) CALL-NUMBER BASED CUSTOMER IDENTIFICATION METHOD FOR PERSONALIZABLE INTERNET PORTALS

(75) Inventors: Siegfried Ergezinger, Mettmann (DE); Dieter Plabmann, Cologne (DE)

(73) Assignee: E-Plus Mobilfunk GmbH & Co. KG, Dusseldorf (DE)

( * ) Notice: Subject to any disclaimer, the term of this patent is extended or adjusted under 35 U.S.C. 154(b) by 1414 days.

(21) Appl. No.: 10/240,092

(22) PCT Filed: Mar. 14, 2001

(86) PCT No.: PCT/EP01/02853
§ 371 (c)(1),
(2), (4) Date: Jan. 21, 2003

(87) PCT Pub. No.: WO01/74026
PCT Pub. Date: Oct. 4, 2001

(65) Prior Publication Data
US 2003/0149583 A1      Aug. 7, 2003

(30) Foreign Application Priority Data

Mar. 27, 2000  (DE) .................................. 100 15 173

(51) Int. Cl.
| H04L 12/16 | (2006.01) |
| H04L 12/28 | (2006.01) |
| H04M 1/56 | (2006.01) |
| H04M 3/42 | (2006.01) |
| H04W 40/00 | (2009.01) |
| G06F 15/16 | (2006.01) |

(52) U.S. Cl. ...... 370/259; 370/351; 370/466; 379/88.17; 379/142.05; 379/201.01; 455/415; 455/445; 709/203; 709/227

(58) Field of Classification Search ................... 370/260, 370/261, 338, 401, 259, 351, 466; 709/219, 709/203, 227; 379/88.17, 142.05, 201.01; 455/415, 445
See application file for complete search history.

(56) References Cited

U.S. PATENT DOCUMENTS

| 6,151,584 A  * | 11/2000 | Papierniak et al. ............. 705/10 |
| 6,275,575 B1 * | 8/2001 | Wu .......................... 379/202.01 |
| 6,549,773 B1 * | 4/2003 | Linden et al. ............... 455/426.1 |
| 6,549,776 B1 * | 4/2003 | Joong ........................... 455/433 |
| 6,587,684 B1 * | 7/2003 | Hsu et al. ..................... 455/419 |
| 6,667,971 B1 * | 12/2003 | Modarressi et al. .......... 370/352 |

(Continued)

FOREIGN PATENT DOCUMENTS

WO        WO 96/15612        5/1996

(Continued)

*Primary Examiner* — Alpus H Hsu
(74) *Attorney, Agent, or Firm* — Dorsey & Whitney LLP

(57) ABSTRACT

A method of customer identification for personalizable Internet portals is described. The method identifies customers on the basis of the phone number of the calling party, in which the phone number and service request is transmitted from the terminal via the access network to a proxy server, which in turn is responsible for converting the protocol between the access network and Internet, in which depending on the service request, the proxy server inserts a customer ID into the service request and the customer ID is called up by the proxy server from a customer registry based on the MSISDN, so that at the portal the ID can be taken from the service request and the authorization of the customer can be verified through an inquiry sent to the customer registry at which point the service request of the customer is fulfilled.

7 Claims, 1 Drawing Sheet

U.S. PATENT DOCUMENTS

| | | | | |
|---|---|---|---|---|
| 6,697,806 B1 * | 2/2004 | Cook | ............................... | 707/10 |
| 6,751,652 B1 * | 6/2004 | Thomas | ........................ | 709/204 |
| 6,766,298 B1 * | 7/2004 | Dodrill et al. | .............. | 704/270.1 |
| 6,775,262 B1 * | 8/2004 | Skog et al. | ..................... | 370/349 |
| 6,822,954 B2 * | 11/2004 | McConnell et al. | ........... | 370/352 |
| 6,865,191 B1 * | 3/2005 | Bengtsson et al. | ............ | 370/475 |
| 6,944,150 B1 * | 9/2005 | McConnell et al. | ........... | 370/352 |
| 7,069,291 B2 * | 6/2006 | Graves et al. | ................. | 709/201 |
| 7,085,260 B2 * | 8/2006 | Karaul et al. | ................. | 370/352 |
| 2003/0128831 A1 * | 7/2003 | Lin et al. | ................... | 379/221.01 |

FOREIGN PATENT DOCUMENTS

| | | | |
|---|---|---|---|
| WO | WO 99/27722 | | 6/1999 |
| WO | WO0046963 | * | 3/2000 |

* cited by examiner

CALL-NUMBER BASED CUSTOMER IDENTIFICATION METHOD FOR PERSONALIZABLE INTERNET PORTALS

TECHNICAL FIELD

The invention relates to a method for customer identification for personalizable Internet portals.

BACKGORUND

In order to provide customers with the simplest means of accessing personalizable portal services, a session is laid down on the portal for the duration of the customer's visit. The customer is identified by a so-called cookie through the transmission of the so-called session. If there is no cookie, the customer's identity is authenticated by means of a user name and password.

This method is only secure up to a point, since cookies can be modified, thereby allowing access to third party data. The authentication by means of a user name and password necessary for secure customer identification is considered annoying and complicated by the customer. This is especially true in the cellular radio environment, where only simplified input is possible due to limitations in the mobile terminals. Furthermore, numerous mobile terminals do not support the use of session ID and cookies. Additionally, the transmission of long session IDs limits the performance of the narrow band carrier services that are common in mobile radios.

Figure 1:
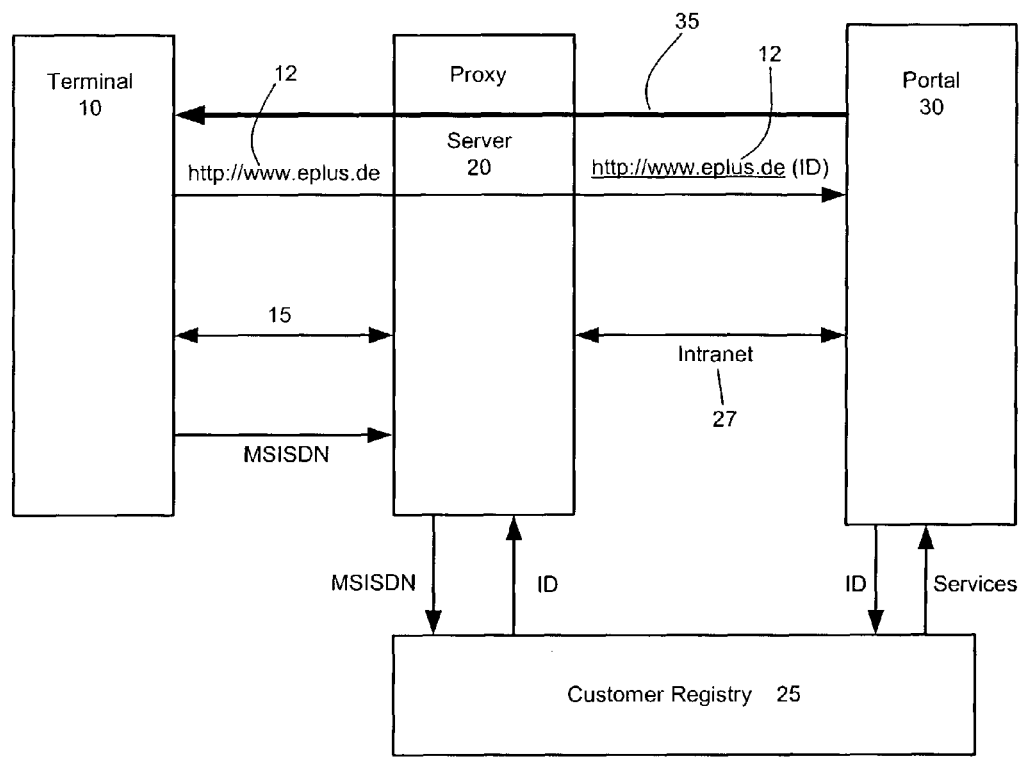
FIG. 1 shows a block diagram of a system for implementing the present invention.
Figure 1:
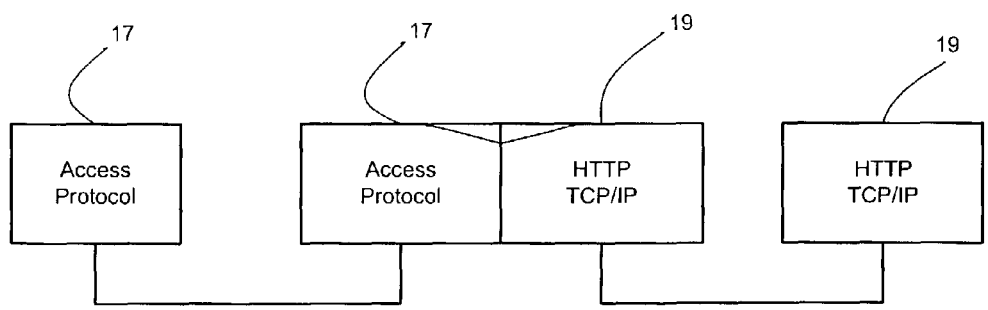

The task of the present invention is to provide the customer with the possibility of secure and user-friendly identification.

SUMMARY

The solution is described in claim 1. Specifically, the solution is provided by a method of customer identification for personalizable Internet portals on the basis of the phone number of the calling party (CLR; calling line ID), in which the phone number and service request 12 is transmitted from the terminal 10 via the access network 15 to a proxy server 20, which in turn is responsible for converting the protocol between the access network protocol 17 and Internet (intranet) protocol 19, in which depending on the service request 12 (HTTP request), the proxy server 20 inserts a customer ID into the service request 12 and the customer ID is called up by the proxy server 20 from a customer registry 25 based on the MSISDN, so that at the portal 30 the ID can be taken from the service request 12 and the authorization of the customer can be verified through an inquiry sent to the customer registry 25 at which point the service request of the customer is fulfilled 35.

DETAILED DESCRIPTION

The method of customer identification in accordance with the present invention allows secure and user-friendly identification of the customer without requiring the additional input of a user name and password. It can be used for fixed network access as well as mobile radio access. The following applications are possible:

WEB/WAB Mail, calendar, address book, collation of personal data

Personalized portal services (internal/external network operators with selected content providers)

E- and M-commerce

Mobile banking

In the customer identification method according to the present invention, the phone number is transmitted from the terminal via the access network to a so-called proxy server, which is responsible for converting the protocol between access network and Internet (intranet) protocols. Depending on the service request (HTTP request), the proxy server inserts a customer ID into the service request. The customer ID is called up from a customer registry (e.g., LDAP) by the proxy server based on the MSISDN.

As an alternative, the MSISDN can also be used directly.

At the portal, the ID of the service inquiry is extracted and an inquiry is sent to the customer registry to check the customer's authorization. If authorization is granted, the service request from the customer is fulfilled. This mechanism will be repeated for each additional service requested by the customer. During the first service request, an additional session will be established in order to store temporary data from the customer. The customer ID is used as the session ID (or alternatively the MSISDN). If there is no further interaction by the customer, the session will be terminated after a timer has expired.

Other Implementations of the Present Invention

Other implementations of the present invention are described in claims 2 to 4.

The present invention is presented more clearly in the drawing—part of which is a diagram.

The characteristics described in the abstract, in the claims section and in the description section, as well as those that are apparent from the drawing, used individually or in any combination, can be essential for the implementation of the invention.

The invention claimed is:

1. A method of customer identification for personalizable Internet portals on the basis of a phone number of a calling party, comprising:
   transmitting the phone number and a service request from a terminal via an access network to a proxy server;
   the proxy server converting a protocol of the service request between the access network and Internet (intranet) protocols;
   the proxy server calling up a customer ID from a customer registry based on a Mobile Station Integrated Services Digital Network number; and
   depending on the service request, the proxy server inserting the customer ID into the service request;
   at a portal, extracting the customer ID from the service request; and
   at the portal, verifying an authorization of the customer through an inquiry sent to the customer registry at which point the service request of the customer is fulfilled.

2. The method according to claim 1, further comprising the operation of establishing an additional session, during an initial service request, whereby data from the customer is saved.

3. The method according to claim 1, wherein the customer ID is used as a session ID.

4. The method according to claim 1, wherein Lightweight Directory Access Protocol is used for the customer registry.

5. The method according to claim 1, further comprising transmitting the Mobile Station Integrated Services Digital Network number from the terminal via an access network to the proxy server.

6. The method according to claim 1, wherein the Mobile Station Integrated Services Digital Network number is used as a session ID.

7. A method of customer identification for personalizable Internet portals on the basis of a phone number of a calling party, comprising:

receiving the phone number and a service request from a terminal via an access network;

converting a protocol of the service request between the access network and Internet (intranet) protocols;

calling up a customer ID from a customer registry based on a Mobile Station Integrated Services Digital Network number; and depending on the service request, inserting the customer ID into the service request;

extracting the customer ID from the service request at a portal; and verifying an authorization of the customer through an inquiry sent to the customer registry at the portal.

* * * * *